Dec. 17, 1946.　　　C. F. CALLAHAN　　　2,412,715
COTTON CHOPPER
Filed April 23, 1945　　　3 Sheets-Sheet 1
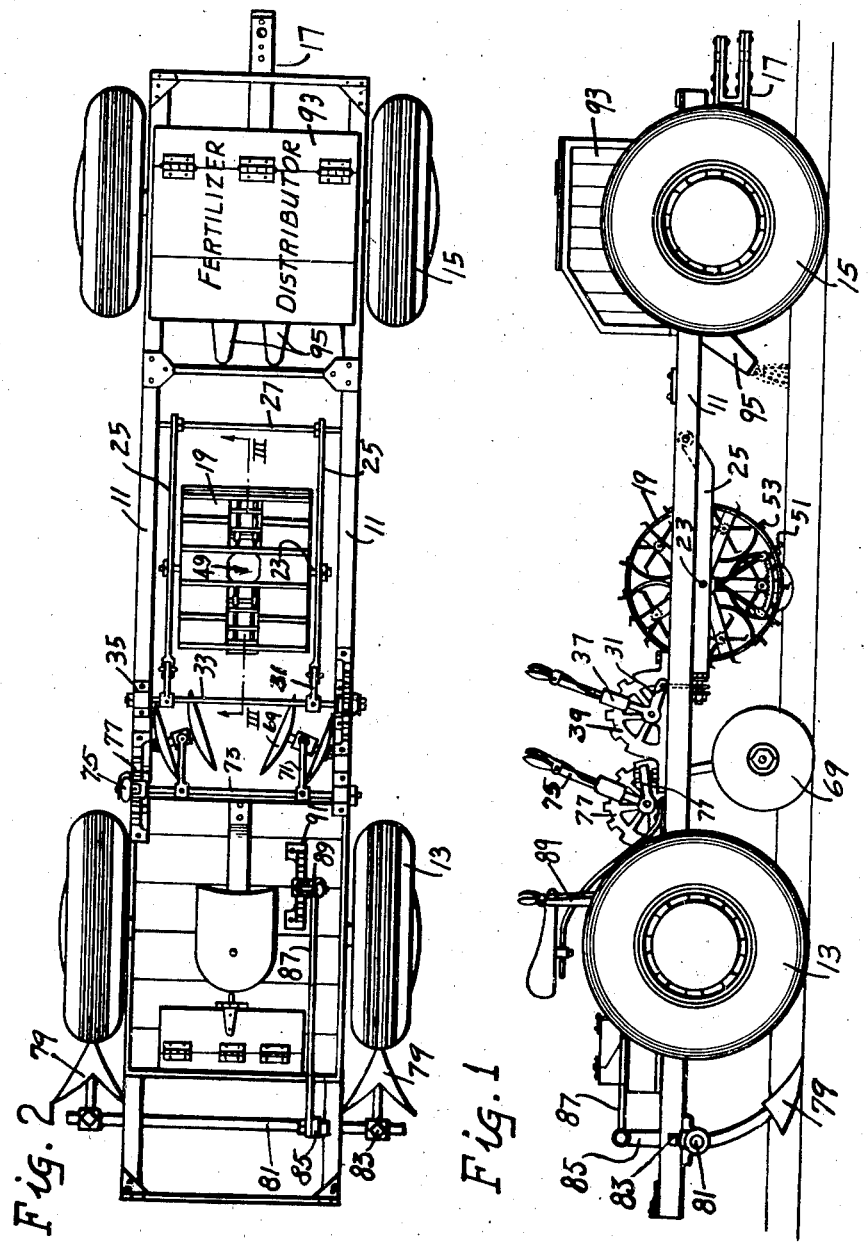
INVENTOR.
CHARLES FREDERICK CALLAHAN
BY
J. H. Weatherford
Atty.

Dec. 17, 1946.   C. F. CALLAHAN   2,412,715
COTTON CHOPPER
Filed April 23, 1945   3 Sheets-Sheet 2

INVENTOR.
CHARLES FREDERICK CALLAHAN
BY
J. H. Weatherford
atty.

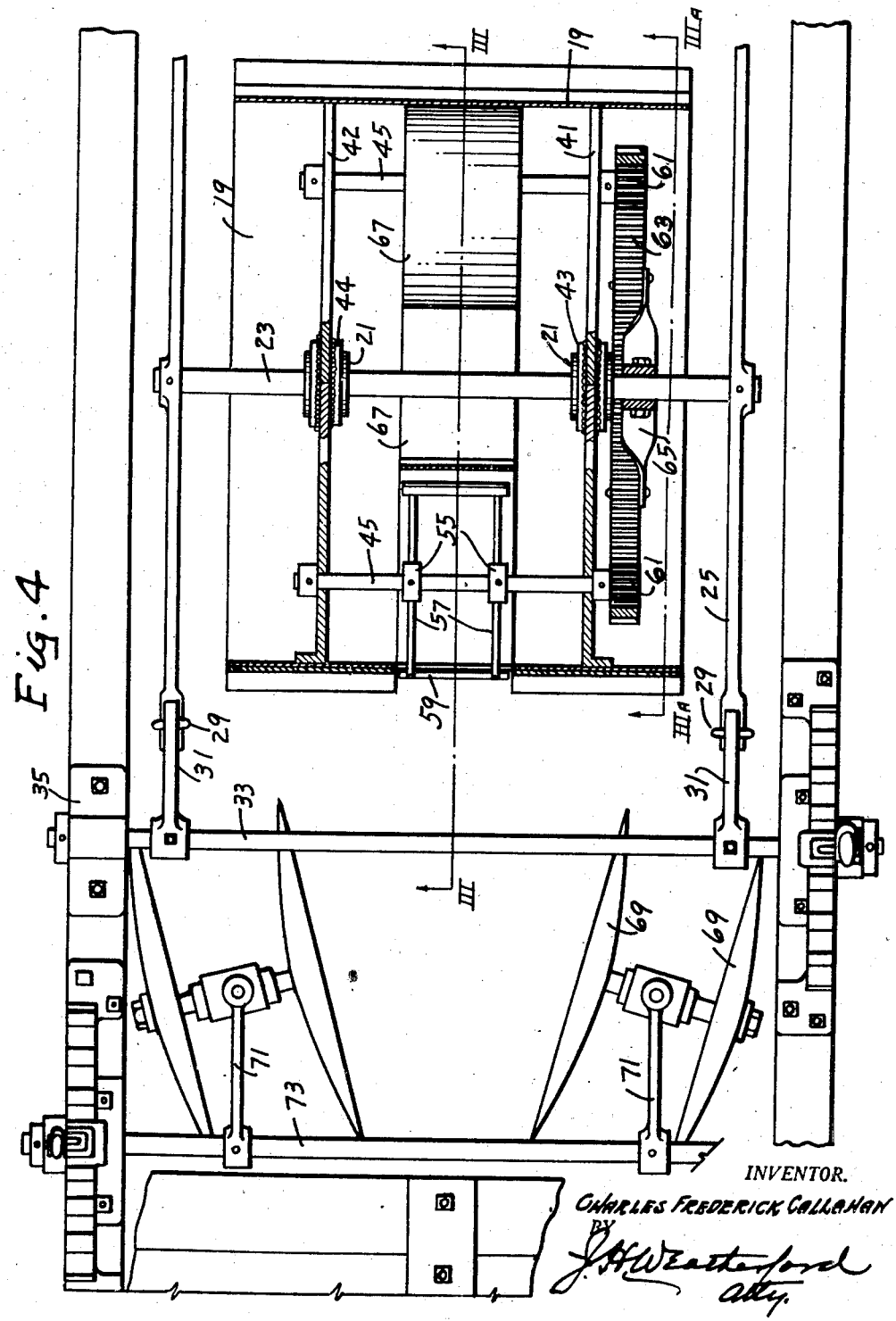

Patented Dec. 17, 1946

2,412,715

UNITED STATES PATENT OFFICE 2,412,715

COTTON CHOPPER

Charles Frederick Callahan, Memphis, Tenn.

Application April 23, 1945, Serial No. 589,891

6 Claims. (Cl. 97—16)

This invention relates to cotton choppers, and has especial reference to a machine for performing the initial chopping on rows of cotton plants.

Cotton is ordinarily planted in rows which are flat on top and between which are furrows. In the rows the cotton seed are closely drilled or sown so that there is a continuous line of closely spaced plants. When these plants are a few inches high the row is chopped out to leave hills, ordinarily containing two or three plants, the intermediate plants originally in the row and between these hills being cleaned out, together with any grass or weeds.

The present machine is primarily intended for the removal of these intermediate plants and grass and weeds which have grown up at the same time. Preferably the machine also includes cultivating devices, such as disc and other plows, which after the chopping, cultivate and throw the dirt against the sides of the rows.

The primary object of the invention is:

To provide means for chopping out the cotton plants, grass and weeds between the hills which are to be left for future cultivation; and To provide a device for this purpose of improved design and construction.

The means by which this and other objects are accomplished, and the manner of their accomplishment, will be readily understood from the following specification upon reference to the accompanying drawings, in which:

Fig. 1 is a side elevation of the complete machine.

Fig. 2 is a corresponding plan view.

Fig. 4 is a fragmentary sectional plan of the drum carrying portion of the machine with the drum itself in sectional plan on the line IV—IV of Fig. 3.

Figure 3:
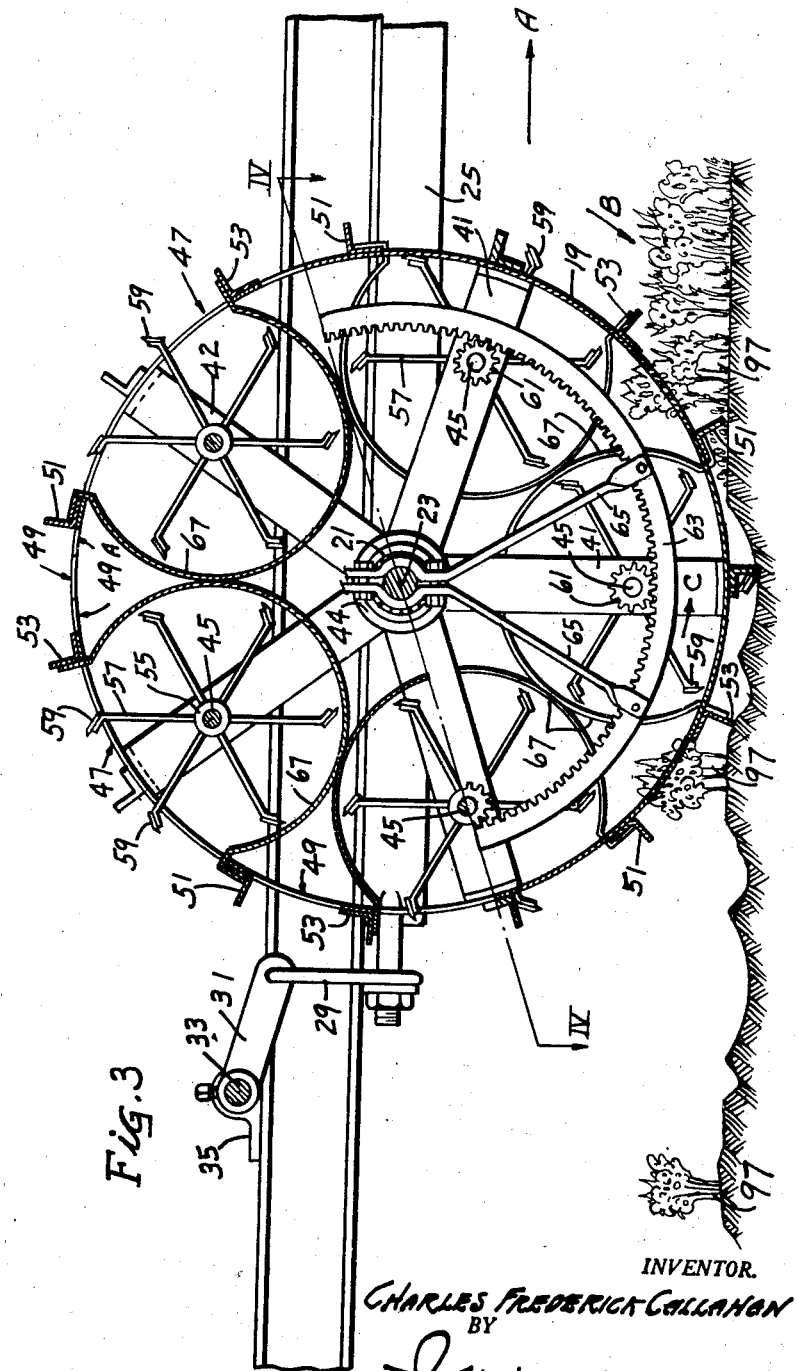
Fig. 3 is an enlarged sectional elevation of the chopping mechanism, the upper half in section on the line III—III of Figs. 1 and 4, and the lower half in section on the line IIIA—IIIA of Fig. 4.

Referring now to the drawings in which the various parts are indicated by numerals:

11 are the side members of a frame which is carried by rear wheels 13 and front wheels 15 and is provided with a coupling device 17, which may be a tongue, through which it can be pulled along the rows, the wheel-supported frame forming a carrier for the chopping and other mechanisms.

Mounted between the frame members 11 is a drum 19 which is journalled through suitable bearings 21 and 22, preferably ball bearings, on a transverse axle 23 located between the wheels. The axle 23 is preferably carried by horizontal arms 25 at opposite ends of the drum and between the frame members 11, to which arms the axle is rigidly attached to prevent its turning. The arms 25 are hingedly supported, preferably at their forward ends, as by a transverse rod 27, and supported at their opposite ends through links 29 to arms 31, which arms in turn are rigidly secured to a transverse shaft 33 mounted to turn in brackets 35 on the opposite side frames.

37 is a lever secured on the shaft 33 through which the shaft 33 may be turned to raised or lower the links 29 and adjust the working level of the arms 25 and the drum supported thereby, and 39 a notched quadrant with which the lever cooperates.

The links 29 are open links which support the ends of the arms 25, but which permit the arms to rise should the drum 19 strike and need to ride over stones or other obstacles in its path.

The drum 19 includes a cylindrical shell to which the identifying numeral has been applied, this shell being carried by two sets of arms 41, 42 which are integrally secured to and radiate respectively from hubs 43, 44 in which the bearings 21, 22 are mounted, there being the same number of arms in each set and these arms in pairs each journalling a shaft 45 of a chopping unit.

In the instant illustration, five pairs of these arms are shown and five chopping units, the drum circumference including five sectors each equal to the desired hill spacing of the cotton. Two openings 47 and 49 are cut in the shell of the drum along a central belt for each of the five sectors, the longer of these openings in each sector being spaced equally on opposite sides of the center of a pair of the arms 41, 42. Angle iron cleats 51 extend transversely across and are secured to the exterior of the drum along one end of each opening 47, there being thus five of these angles equally spaced defining the sectors. Five additional angle iron cleats 53 extend transversely across the drum along the opposite ends of these openings. The shell is cut away between the cleats 51 and 53 in the same central belt to form the openings 49. The openings 47 are rectangular and the openings 49 may be of similar shape, but preferably corners 49A thereof are not cut out and these smaller openings are octagonal. On both sides of the central belt the shell is uninterrupted around the entire circumference.

In the instant machine, the spacing of the hills to be left has been selected as thirteen inches, the circumference of the drum is sixty-five inches, Each sector from cleat 51 to cleat 51 around the shell is thirteen inches. The length of the larger openings 47, is eight inches, and of the smaller openings 49, three inches, and the angles 51 and 53 are one inch by one inch.

Mounted on each shaft 45 and secured thereto are a pair of hubs 55, from which project arms 57, which in pairs carry hoes 59, the spacing of the shafts 45 from the periphery of the drum being such that the cutting edges of the hoes 59 as they turn, project about equally with the cleats 51 or 53 beyond the face of the shell. At one end, the shafts 45 extend beyond the arms 41 in which they are journalled and have secured thereon pinions 61.

63 is an internal ring gear concentric with the axle 23, which gear is supported by arms 65, rigidly clamped to the axle 23 and held thereby against movement, this gear having teeth of the same pitch as the pinions 61 and being of pitch diameter to engage the pinion teeth and turn the pinions and their shafts, whirling the hoes around in and beyond the drum, as the drum turns about the axle 23 in rolling along the row.

67 are arcuate shields concentric with the shafts 45 and the hoes 59, which shields terminate at opposite sides of the openings 47 and are supported as by being secured to the angle irons 51 and 53 on the opposite sides of these openings, these shields having the same width as the openings 47. Preferably both the drum 19 and the arcuate shields are open at their ends.

The frame preferably also carries rearwardly of the chopping drum, discs 69, journalled in usual manner, which discs may be raised and lowered through arms 71 mounted on a transverse shaft 73, the shaft being turned to raise or lower the discs and support them in adjusted position by a lever 75 and quadrant 77 assembly.

Rearwardly of the rear wheels 13 are plows 79 which are carried by a cross shaft 81 carried by the frame members 11, the plows being mounted on the shaft for inward or outward shift and being rigidly secured to the shaft, as by set screws 83. Secured to and extending upward from the shaft is an arm 85 which is connected through a link 87 to a lever 89 and quadrant 91 assembly through which adjustment and support is effected.

A fertilizer distributor 93 may be mounted on the forward end of the machine if so desired, the working mechanisms of such distributors being well known, and per se forming no part of the present invention, not being herein delineated, though spouts 95 discharging along opposite sides of the row of plants are suggested.

It will be understood also that with the exception of the chopping mechanism all the other devices, such as the discs and other type plows, and the distributor are intended as illustrative only of the use of such mechanisms in connection with a chopper. It will also be understood that steering mechanism for the front wheel has been purposely omitted as being well known.

In use, the machine with the disc and other plows and the chopping mechanism raised and supported by their respective lever quadrant assemblies 75—77, 89—91, and 37—39 is drawn by a tractor, or team, to the field and alined over the cotton row to be chopped and cultivated, with the wheels in the furrows on opposite sides of the row. The chopping mechanism lever is released and the drum 19 allowed to rest in rolling relation on the top of the row and the discs and other plows adjusted to proper depth. The machine is then pulled along the rows, as in the direction of the arrow A, Fig. 3, the cleats 51 and 53 digging into the row to compel turning of the drum. As the drum turns the chopping units are successively carried downward in the direction of the arrow B into cutting engagement with the row, the pinions 61 being turned by the ring gear 63, whirling the hoes 59 at high speed in the direction of the arrow C, and the arrow A. As the drum thus turns, the cleats crush down some of the plants, with those 97 immediately forward of a cleat 51 and rearward of the adjacent cleat 53, and which form the hills, entering the opening 49 in the drum and protected by the shields 67, while those rearwardly of the cleats 51, and forwardly of the cleats 53, are left uncovered by the openings 47 and subject to the chopping action of the hoes 59. As forward movement of the drum progresses the hoes cut into the top of the row removing plants, grass and dirt, and the cleats break out the crushed plants and dirt at the ends of the portion chopped by the hoes, leaving the retained plants slightly hilled up in the row, with the plants and grass therebetween removed, and the row surface cultivated.

I claim:

1. In a cotton chopper, a carrier having laterally spaced frame members, a drum disposed transversely to said carrier carried by said members and journalled for free rotation, said drum including a cylindrical shell of girth equalling a plurality of sectors, each of the desired hill-spacing length, said shell having therethrough adjacent openings disposed circumferentially along and around its longitudinal center, with a pair of said openings in each sector, one opening of each said pair being rectangular and circumferentially of much greater length than the other thereof, cleats disposed longitudinally along said shell, between said openings, arms secured to and extending inward from said shell on opposite sides of said longer openings, chopping means, each including a shaft, journalled in a pair of said arms, and having radiating arms carrying hoes on their outer ends, said shaft journal being radially inward from the center of a said opening and positioned to project said hoes as they turn through said opening and beyond the surface of said shell, each said shaft having on one end thereof a pinion; an internal ring gear concentric with said shell meshing with said pinions, and means anchoring said gear against rotation.

2. In a cotton chopper, a carrier having laterally spaced frame members, a drum disposed transversely to said carrier, carried by said members and journalled for free rotation, said drum including a cylindrical shell of girth equalling a plurality of sectors, each of the desired hill-spacing length, said shell having therethrough adjacent openings disposed circumferentially along and around its longitudinal center, with a pair of said openings in each sector, one opening of each said pair being rectangular and circumferentially of much greater length than the other thereof, arms secured to and extending inward from said shell on opposite sides of said longer openings, chopping means, each including a shaft, journalled in a pair of said arms, and having radiating arms carrying hoes on their outer ends, said shaft journals being radially equally inward from the centers of said openings and positioned to project the chopping path of said hoes through said openings and beyond the surface of said shell, each said shaft having on one end thereof a pinion; an internal ring gear meshing with said pinions, and means anchoring said gear to said carrier against rotation.

3. In a cotton chopper, a carrier having laterally spaced frame members, an axle disposed transversely to said carrier and secured against rotation to said members, a drum disposed between said members and having spaced hubs journalled for free rotation on said axle, said drum including a cylindrical shell of girth equalling a plurality of sectors, each of the desired hill-spacing length, said shell having therethrough adjacent openings disposed circumferentially along and around its longitudinal center, with a pair of said openings in each sector, one opening of each said pair being rectangular and circumferentially of much greater length than the other thereof, cleats disposed longitudinally along said shell, between said openings, arms secured to said hubs and extending therefrom to said shell on opposite sides of said longer openings, chopping means, each including a shaft, journalled in a pair of said arms on opposite sides of a said opening, arms secured to and radiating from said shaft and carrying hoes on their outer ends, said shaft journals being radially equally inward from the centers of said openings and positioned to project said hoes as they turn through said openings and beyond the surface of said shell, each said shaft having on one end thereof a pinion; and an internal ring gear meshing with said pinions, carried by said axle and anchored against rotation thereto.

4. In a cotton chopper, a carrier, a drum disposed transversely to said carrier carried thereby and journalled for free rotation, said drum including a cylindrical shell of girth equalling a plurality of sectors, each of the desired hill-spacing length, said shell having therethrough, adjacent openings disposed circumferentially along and around its longitudinal center, with a pair of said openings in each sector, one opening of each said pair being rectangular and circumferentially of much greater length than the other thereof, cleats disposed longitudinally along said shell, between said openings, arms secured to and extending inward from said shell on opposite sides of said longer openings, chopping means, each including a shaft, journalled in a pair of said arms, arms secured to said shaft and radiating therefrom, carrying hoes on their outer ends, said shaft journal being radially inward from the center of a said opening and positioned to project said hoes as they turn through said opening and beyond the surface of said shell, each said shaft having on one end thereof a pinion; an internal ring gear concentric with said shell meshing with said pinions, means anchoring said gear against rotation, and shields, each extending within said shell from one end of a said longer opening arcuately around the related hoe to the opposite end of said opening.

5. In a cotton chopper, a carrier having laterally spaced frame members, arms disposed along and between said frame members and hingedly connected at their forward ends to said members, means carried by said members adjustably supporting the rear ends of said arms, and including linkage allowing free upward movements of said arms, an axle secured against rotation to said arms, and extending transversely therebetween, a drum including a cylindrical shell of girth equalling a plurality of sectors, each of the desired hill-spacing length, said shell having therethrough openings disposed in adjacency circumferentially around its longitudinal center, with a pair of said openings in each sector, one opening of each said pair being rectangular and circumferentially of greater length than the other thereof, cleats disposed longitudinally along said shell between said openings, hubs spaced apart and journalled on said axle, arms equalling in number said sectors secured to said hubs and radiating therefrom to said shell on opposite sides of said longer openings; chopping means, each including a shaft journalled in a pair of said arms, hubs secured on said shaft, spokes secured to and radiating from said hubs, and hoes carried by the outer ends of said spokes, said shaft journals being radially inward from the center of said openings and positioned to project said hoes as they turn, through said opening and beyond the surface of said shell, each said shaft having on one end thereof a pinion; and an internal ring gear meshing with said pinions, said gear being carried and secured against rotation by said axle.

6. In a cotton chopper, a carrier having laterally spaced frame members, a drum disposed transversely to said carrier, carried by said members and journalled for free rotation, said drum including a cylindrical shell of girth equalling a plurality of sectors, each of the desired hill-spacing length, said shell having therethrough adjacent openings disposed circumferentially along and around its longitudinal center, with a pair of said openings in each sector, one opening of each said pair being rectangular and circumferentially of much greater length than the other thereof, arms secured to and extending inward from said shell on opposite sides of said longer openings, chopping means, each including a shaft, journalled in a pair of said arms, a hub secured on said shaft, arms radiating from said hub and carrying hoes on their outer ends, said shaft journals being radially inward from the centers of said openings and positioned to project the hoes as they turn through said openings and beyond the surface of said shell, each said shaft having on one end thereof a pinion; gear means meshing with said pinions, means anchoring said gear means to said carrier against rotation, and means within said shell each respectively shielding a said chopping means.

CHARLES FREDERICK CALLAHAN.